US006772908B2

(12) United States Patent
Roethel et al.

(10) Patent No.: US 6,772,908 B2
(45) Date of Patent: Aug. 10, 2004

(54) BLOW-MOLDED CUP DISPENSER AND METHOD OF MANUFACTURING SAME

(75) Inventors: Henry G. Roethel, Ravenna, OH (US); Raymond P. Kawolics, Solon, OH (US); Michael H. Meyer, Sagamore Hills, OH (US)

(73) Assignee: The Meyer Company, Cleveland, OH (US)

( * ) Notice: Subject to any disclaimer, the term of this patent is extended or adjusted under 35 U.S.C. 154(b) by 45 days.

(21) Appl. No.: 09/779,079

(22) Filed: Feb. 8, 2001

(65) Prior Publication Data

US 2001/0032860 A1 Oct. 25, 2001

Related U.S. Application Data

(60) Provisional application No. 60/182,438, filed on Feb. 15, 2000.

(51) Int. Cl.[7] ............................................. B65G 59/00
(52) U.S. Cl. ...................... 221/279; 221/303; 221/307
(58) Field of Search ............................. 221/279, 303, 221/307

(56) References Cited

U.S. PATENT DOCUMENTS 1,207,092 A * 12/1916 Sullivan
4,925,058 A * 5/1990 Ozawa ........................ 221/279
5,014,878 A * 5/1991 Janz ............................. 221/279
5,199,601 A    4/1993 Roethel
5,201,869 A    4/1993 Roethel
5,222,628 A * 6/1993 Roethel ....................... 221/307
5,709,316 A * 1/1998 Jolly et al. .................. 221/304
5,941,415 A    8/1999 Roethel
6,199,723 B1 * 3/2001 Collins et al. ............... 221/307

* cited by examiner

Primary Examiner—David H. Bollinger
(74) Attorney, Agent, or Firm—Fay, Sharpe, Fagan, Minnich & McKee, LLP

(57) ABSTRACT

A cup dispenser includes a blow-molded plastic storage tube and a blow-molded plastic cup pushing member or follower positioned within the tube. The pushing member is optionally spring-biased toward an open first end of the tube away from a closed, second end of the tube. A resilient diaphragm is positioned over the open end of the cup storage tube or another suitable cup retainer is employed for releasably retaining a telescopically interfitted stack of cups in the storage tube. An annular collar is arranged coaxial with and fitted to the storage tube in the region of the open end. The cup storage tube and the cup pushing member are preferably blow-molded together in a single operation as a one-piece construction. The cup pushing member is separated from the cup storage tube for use.

5 Claims, 3 Drawing Sheets

BLOW-MOLDED CUP DISPENSER AND METHOD OF MANUFACTURING SAME

CROSS-REFERENCE TO RELATED APPLICATION

This application claims priority from U.S. provisional application No. 60/182,438 filed Feb. 15, 2000.

BACKGROUND OF THE INVENTION

The present invention is directed toward the art of cup dispensers and, more particularly, to a new and non-obvious diaphragm-type cup dispenser assembly and method of manufacturing same. The subject cup dispenser is particularly convenient and cost-effective to manufacture and assemble, and is also easy to install and remove as required for cleaning and other purposes.

Cup dispensers of the type under consideration are commonly employed in fast-food restaurants and convenience stores to maintain a supply of paper, plastic, foam, and/or other disposable cups near beverage or soft-serve frozen food dispensing equipment for use as required. The dispensers typically comprise a storage tube or cylinder that holds a telescopically interfitted stack of cups. A resilient diaphragm with an open central portion is placed across an open end of the storage tube, and the closed end or bottom of the outermost cup projects outwardly through the open central portion of the diaphragm. The cups in the stack are larger in cross-sectional dimension than the opening in the diaphragm and, thus, the diaphragm resiliently grips the outermost cup and prevents same from passing beyond the diaphragm. This, then, also prevents any other cups in the stack from exiting the storage tube through the opening in the diaphragm.

To dispense a cup, a user simply pulls the exposed outermost cup so that the diaphragm distends/dilates sufficiently to allow this cup to pass through the diaphragm opening. As the outermost cup is pulled from the stack, the diaphragm grips the next or adjacent cup in the stack and prevents same from passing through the diaphragm opening until a user pulls same with sufficient force. The cup dispenser can be mounted with the diaphragm located at a lower end of the storage tube so that the cups are gravity-fed toward the diaphragm, or can be mounted at any other angle as desired. In some cases, it is necessary and convenient to use a spring or the like to bias the stack of cups toward the diaphragm so that the bottom of the outermost cup always projects through the opening defined in the diaphragm. These diaphragm-type cup dispensers have enjoyed widespread commercial success, and are available from Tomlinson Industries, Modular Dispensing Systems Division, Cleveland, Ohio 44125.

Heretofore, diaphragm cup dispensers of the type described have typically used metal, such as stainless steel, to define the cup storage tube. The use of stainless steel is desirable in light of its combination of durability and corrosion resistance. Unfortunately, the use of stainless steel or other corrosion-resistant metals adds significant expense to these cup dispensers, both in terms of material costs and labor.

Furthermore, a need has been identified for a new and improved method of manufacturing a diaphragm-type cup dispenser. Specifically, it has been deemed desirable to develop and method of manufacturing a diaphragm-type cup dispenser in a manner that eliminates the requirement for tools during the assembly process.

SUMMARY OF THE INVENTION

In accordance with the present invention, a novel and non-obvious cup dispenser and a method of manufacturing same are provided. The dispenser comprises a blow-molded plastic storage tube, and a blow-molded plastic cup pushing member or follower positioned within the tube and preferably spring biased toward an open first end of the tube away from a closed, second end of the tube. In the preferred embodiment, a conventional coil spring is placed within the tube between the closed tube end and the cup pushing member to bias the cup pushing member toward the open end of the storage tube. A conventional resilient diaphragm is positioned over the open end of the cup storage tube or other suitable cup retaining means are employed for releasably retaining a telescopically interfitted stack of cups in the storage tube. The diaphragm or other cup retaining means regulates the passage of individual cups out of the open first end of the storage tube.

The blow-molded storage tube can be defined with any desired or convenient cross-sectional shape and can include a plurality of bosses that project radially outward from an outer surface of the storage tube in the region of the open end of the tube. These bosses are preferably each defined in the storage tube during the tube molding operation. An annular collar is arranged coaxial with and fitted to the storage tube in the region of the projecting bosses. A cylindrical portion of the collar includes or defines a plurality of apertures or recesses that, owing to the natural resiliency of the tube, respectively engage the bosses with a snap-fit. Accordingly, the collar is releasably yet fixedly secured to the storage tube in an operative position. The collar includes a flange projecting radially outward therefrom, and this flange preferably defines plural key-slots that are used for mounting the dispenser assembly in a cabinet or to another mounting structure.

The cup dispenser is preferably installed in a cabinet or other mounting location by forming an opening in the cabinet sufficiently large and deep to accept the storage tube. The closed, second end of the storage tube is positioned in the cabinet opening, and the storage tube is inserted into the cabinet a sufficient distance so that the radial flange of the collar abuts a surface of the cabinet or other mounting structure. Screws or other suitable fasteners are used to fixedly secure the flange of the collar to the cabinet, preferably by way of the key-slots that allow the dispenser to be removed from the cabinet by simply loosening the screws and rotating the dispenser to disengage the flange from the screws.

The cup storage tube and the cup pushing member or follower are preferably blow-molded together in a single operation as a one-piece construction from conventional food-grade polyvinyl chloride or another suitable plastic material. After the molding operation, the cup pushing member is severed or otherwise separated from the cup storage tube (along with any other extraneous projections formed as a byproduct of the molding operation). In this manner, the blow molding presses are operated at optimal efficiency, and the overall cost of molding the cup dispenser assembly is reduced.

One advantage of the present invention resides in the provision of a novel and non-obvious diaphragm-type cup dispenser.

Another advantage of the present invention is found in the provision of a cup dispenser assembly that is defined from molded plastic and that is easy to manufacture.

A further advantage of the present invention resides in the provision of a low-cost and durable cup dispenser assembly, the capacity of which can be easily adjusted in the field to fit into a shallow depth mounting location.

Still another advantage of the present invention is the provision of a lower cost cup dispenser.

A still further advantage of the present invention is the provision of a cup dispenser assembly that includes a snap-fit removable mounting collar.

A yet further advantage of the present invention is the provision of an improved method for manufacturing a cup dispenser assembly, wherein the dispenser assembly is assembled without screws and similar fasteners.

Another advantage of the present invention resides in the provision of a method for manufacturing a diaphragm-type cup dispenser assembly, wherein the cup storage tube and cup pushing member are molded from a plastic material as a one-piece construction and later separated for assembly of the cup dispenser.

Still other benefits and advantages of the invention will become apparent to those of ordinary skill in the art to which the invention pertains upon reading and understanding the following specification.

BRIEF DESCRIPTION OF THE DRAWINGS

The invention takes form in various components and arrangements of components, and in various steps and arrangements of steps, preferred embodiments of which are described herein and illustrated in the accompanying drawings that form a part hereof and wherein.

DETAILED DESCRIPTION OF PREFERRED EMBODIMENTS

Figure 1:
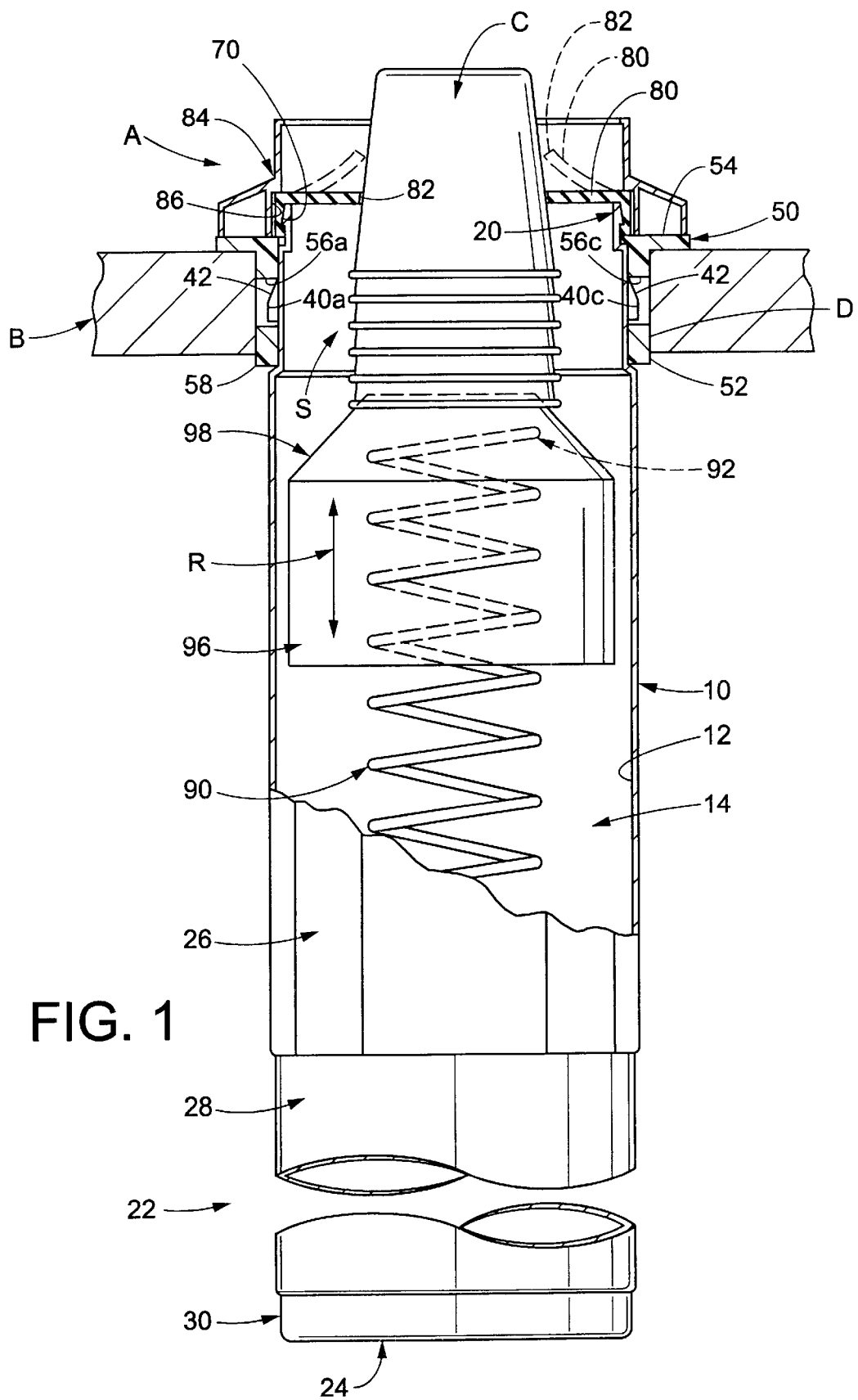
FIG. 1 illustrates a cup dispenser formed in accordance with the present invention as installed in a mounting structure, with portions of the dispenser and mounting structure broken away.
Figure 2:
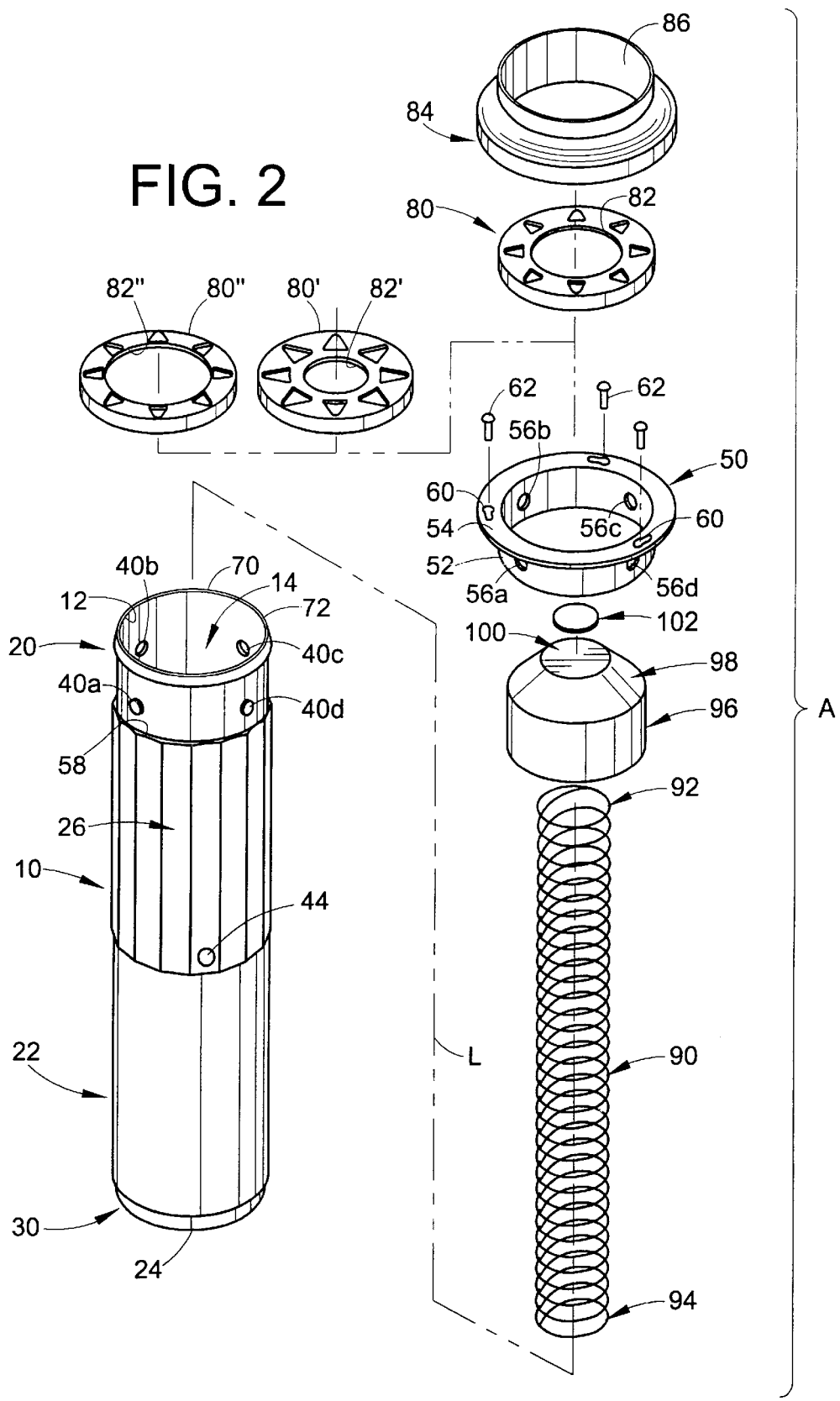
FIG. 2 is an exploded perspective view of the cup dispenser of FIG. 1.

Referring now to the drawings, wherein the showings are for purposes of illustrating preferred embodiments of the invention only and not for limiting same, FIGS. 1 and 2 illustrate a diaphragm-type cup dispenser assembly A formed in accordance with the present invention. As illustrated in FIG. 1, the dispenser A is mounted in a cabinet or other mounting structure B and is adapted to maintain a supply of cups C in a readily available condition. The mounting structure B defines an opening D into which the cup dispenser is A is inserted and, as is described in full detail below, the dispenser A is fixedly secured to the mounting structure B in an operative position.

More particularly, the cup dispenser A comprises an elongated cup storage tube 10 including an inner surface 12 that defines a hollow cup storage region 14. The tube 10 is illustrated in the preferred, substantially cylindrical conformation, but those of ordinary skill in the art will recognize that the tube 10 can be defined in any of a wide variety of other configurations so that it defines an elongated cup storage region 14 adapted to receive and confine a telescopically interfitted stack S of cups C.

The cup storage tube 10, itself, is elongated along a longitudinal axis L (FIG. 2) and comprises an open first end 20 and a closed second end 22. The second end 22 is closed by an integral transverse end wall 24. The cup storage tube 10 preferably comprises a fluted region 26 extending at least from its central region toward the open first end 20. The fluted region 26 imparts strength to the tube 10 and also facilitates manual grasping of the tube 10. The closed, second end 22 of the tube 10 is preferably defined by a smooth-walled cylindrical portion 28 that terminates in a reduced-diameter portion 30. The reduced-diameter portion 30 includes the transverse end wall 24. To adjust the overall length of the cup storage tube 10, the reduced-diameter portion 30 is severed from the tube 10, and the smooth-walled portion 28 of the tube is cut to the desired length. Thereafter, the reduced diameter portion 30 is fitted in the cup receiving space 14 and attached to the surrounding tube inner surface 12 with an adhesive or other suitable fastening means so that the end wall 24 once again closes the second end 22 of the tube 10. Those of ordinary skill in the art will recognize that the cup dispenser 10 is, thus, adapted for installation in a wide variety of mounting structures having varying dimensions.

The cup storage tube 10 includes a plurality of lugs or bosses 40a–40d defined therein near the open first end 20. The bosses 40a–40d are preferably defined during the molding of the tube 10 and project outwardly from the outer surface of the tube 10. As illustrated in FIG. 1, the bosses 40a–40d each define a sloping face 42 that diverges away from the tube 10 moving in a direction from the first end 20 toward the second end 22 of the tube. The illustrated cup storage tube 10 includes four bosses 40a–40d defined symmetrically about the tube, but those of ordinary skill in the art will recognize that any number of bosses can be defined, and that these can be arranged in any desired relationship relative to each other on the tube 10.

The cup dispenser assembly A further comprises an annular mounting collar 50 defined by a cylindrical portion 52 and a radial flange 54 that projects radially outward from the cylindrical portion 52. The cylindrical portion 52 includes or defines a plurality of recesses or apertures 56a–56d that open at least inwardly toward the center of the collar 50. These openings 56a–56d are adapted for respective engagement with the bosses 40a–40d when the collar 50 is coaxially fitted to upper end 20 of the tube 10 as illustrated in FIG. 1. In particular, the cylindrical portion 52 of the collar 50 is adapted for close, sliding receipt over the open end 20 of the cup storage tube 10. Initially, the bosses 40a–40d inhibit movement of the collar 50 therepast. However, when additional force is exerted on the collar 50 urging it toward the second end 22 of the tube 10, the collar exerts a radially inwardly directed force on the sloped faces 42 of the bosses 40a–40d, and the natural resilience of the tube 10 allows the bosses to move radially inwardly so that the cylindrical portion 52 of the collar 50 slides over the bosses 40a–40d. Preferably, the cup storage tube 10 defines a radially enlarged shoulder 58 that limits axial movement of the collar 50 toward the second end 22 of the tube 10. With the collar 50 seated adjacent the shoulder 58, the collar 50 is rotated, if necessary, until the bosses 40a–40d align respectively with the collar openings 56a–56d. When aligned or registered with the openings 56a–56d, the bosses 40a–40d respectively engage the opening 56a–56d in a snap-fit arrangement thus releasably locking the collar 50 to cup storage tube 10 adjacent the open upper end 20.

The collar flange 54 defines a plurality of mounting apertures, preferably in the form of keyhole slots 60. When the cup dispenser A is to be installed into a mounting structure B, the closed second end 22 of the tube 10 is placed into an opening D defined in the mounting structure, and tube 10 is inserted into the mounting structure through the opening D until the collar flange 54 abuts a surface of the mounting structure as illustrated in FIG. 1. The flange 54 is then fixedly secured to the mounting structure B, preferably by use of the fasteners 62 that pass through the keyhole slots 60. Those of ordinary skill in the art will recognize that the use of coacting screws 62 and keyhole slots 60 facilitates installation and removal of the cup dispenser assembly A relative to the mounting structure B in that, after the cup dispenser A is initially secured to the mounting structure B, the screws 62 need only be loosened sufficiently to allow the flange 54 to be rotated in order to disengage the screws 62 from the keyhole slots 60 with which they are respectively engaged.

With the collar 50 operably fitted to the cup storage tube 10, an outermost edge 70 of the tube 10 projects outwardly above the flange 54. This outermost tube edge 70 provides a convenient mounting location for a flexible diaphragm member 80 that defines a central opening 82. As illustrated in FIG. 1, the diaphragm member 80 is preferably dished and sized appropriately so that it frictionally engages the outermost edge 70 of the cup storage tube 10. The edge 70 preferably includes or defines a radially enlarged lip 72 that engages the diaphragm member 80 to strengthen the frictional engagement between the member 80 and the tube 10.

With particular reference now to FIG. 2, the diaphragms 80',80" are similar in all respects to the diaphragm 80, but include central openings 82',82" that are defined to have a different size compared to the opening 82 of the diaphragm 80 as required to accommodate differently sized cups C. Either diaphragm 80',80" can be substituted for the diaphragm 80 without departing from the overall scope and intent of the present invention. Suitable diaphragm members, and operation of same to retain cups C releasably in the cup storage tube 10, are described, e.g., in U.S. Pat. Nos. 5,199,601 and 5,201,869, both of which patents are hereby expressly incorporated by reference herein. Furthermore, suitable diaphragm members 80,80',80" are available commercially from Tomlinson Industries, Modular Dispensing Systems Division, Cleveland, Ohio 44125.

Once the diaphragm member 80 is fitted to the outermost edge 70 of the tube 10, a clamp ring 84 is fitted to the outermost edge 70 of the tube 10. The clamp ring 84 defines a central opening 86 that is adapted for tight, frictional receipt of the outermost tube edge 70 therein. Thus, after the diaphragm member 80 is fitted to the tube edge 70, the clamp ring 84 is also fitted to the tube edge 70 and secures the diaphragm 80 in its operative position with a tight friction fit, i.e., the diaphragm 80 is pinched between the tube edge 70 and the clamp ring 84 as is readily apparent in FIG. 1.

The cup storage tube 10 can be secured to a mounting structure B in an arrangement where the open first end 20 of the tube 10 is placed at a lower elevation than the closed second end 22. In this arrangement, cups C from the stack S are fed through the diaphragm opening 82 by gravity. However, it is most preferred that the cup dispenser assembly A comprise means for biasing the stack S of cups C toward the diaphragm 80 so that the closed end (bottom) of the outermost cup C projects outwardly through the diaphragm opening 80, regardless of the elevation at which the open tube end 20 is arranged relative to the closed tube end 22. In the illustrated embodiment, a coil spring 90 is disposed in the hollow cup storage region 14 coaxial with the axis L. A follower or cup pushing member 96 is closely and slidably positioned within the hollow cup storage region 14 of the tube 10. A first end 92 of the coil spring 90 is seated against the cup pushing member 96, and a second end 94 of the spring 90 is seated against the transverse end wall 24 of the tube 10. Thus, those of ordinary skill in the art will recognize that the spring 90 biases the cup pushing member 96 away from the end wall 24 toward the open first end 20 of the cup storage tube 10. The cup pushing member 96 is adapted for reciprocal sliding movement on the axis L as indicated by the arrow R. Of course, the coil spring 90 can be replaced by any other suitable biasing means, and it is not intended that the invention be limited to any particular type of spring or other means for biasing the cup pushing member 96 toward the open first end 20 of the cup storage tube 10.

The outwardly facing pushing surface 98 of the cup pushing member 96 is conformed to engage the open mouth of the innermost cup C of the stack S. Preferably, the pushing surface 98 is conical, frusto-conical (as shown), or otherwise tapered in a manner that diverges moving in a direction away from the open first end 20 of the tube 10. Such a tapered surface 98 ensures that the open mouths of a wide variety of differently sized cups C will be securely seated on the pushing surface 98. The preferred, frusto-conical shape of the cup pushing surface 98 provides an exposed transverse surface 100 that is a convenient and effective location for placement of indicia, such as a label 102, that is visible through the diaphragm opening 82 (when the dispenser assembly A is empty of cups C) and can be used to provide a user with information concerning the cup sizes/types for which the dispenser assembly 10 is designed.

The cup dispenser assembly A operates in a conventional manner as is well understood by those of ordinary skill in the art and as described in the aforementioned U.S. Patents. A telescopically interfitted stack S of cups C is inserted into the cup storage space 14 through the central opening 82 of the diaphragm 80 with the open mouth of the innermost cup engaging the pushing surface 98 of the cup pushing member 96. The cup stack S is pushed into the cup storage space 14 with sufficient force to overcome the biasing force of the spring 90 so that the cup pushing member 96 moves inwardly toward the closed second end 22 of the tube 10. After the cup stack S is loaded into the cup receiving region 14, the cup pushing member 96, in response to the biasing force of the spring 90, urges the cup stack S outwardly toward the open first end 20 of the tube 10 so that the closed end or bottom of the outermost cup C in the stack S projects out of the diaphragm opening 82. To dispense a single cup C, a user manually pulls the outermost exposed cup C so that the diaphragm 80 distends (as shown in broken lines in FIG. 1) and so that the outermost cup C is able to pass through the diaphragm opening 82. However, the diaphragm 80 engages the next outermost cup C in the stack S and prevents its unintended exit from the cup storage space 14 together with the outermost cup C pulled by a user. As illustrated in FIG. 2, it is most preferred that the cup storage region 14 in the cup storage tube 10 be in fluid communication with the surrounding atmosphere through a vent hole 44 or the like so as to prevent the development of a vacuum within the tube 10 when a cup C from the stack S is withdrawn from the dispenser assembly A owing to the airtight engagement of the diaphragm member 80 with the outermost cup C of the stack S.

Figure 3:
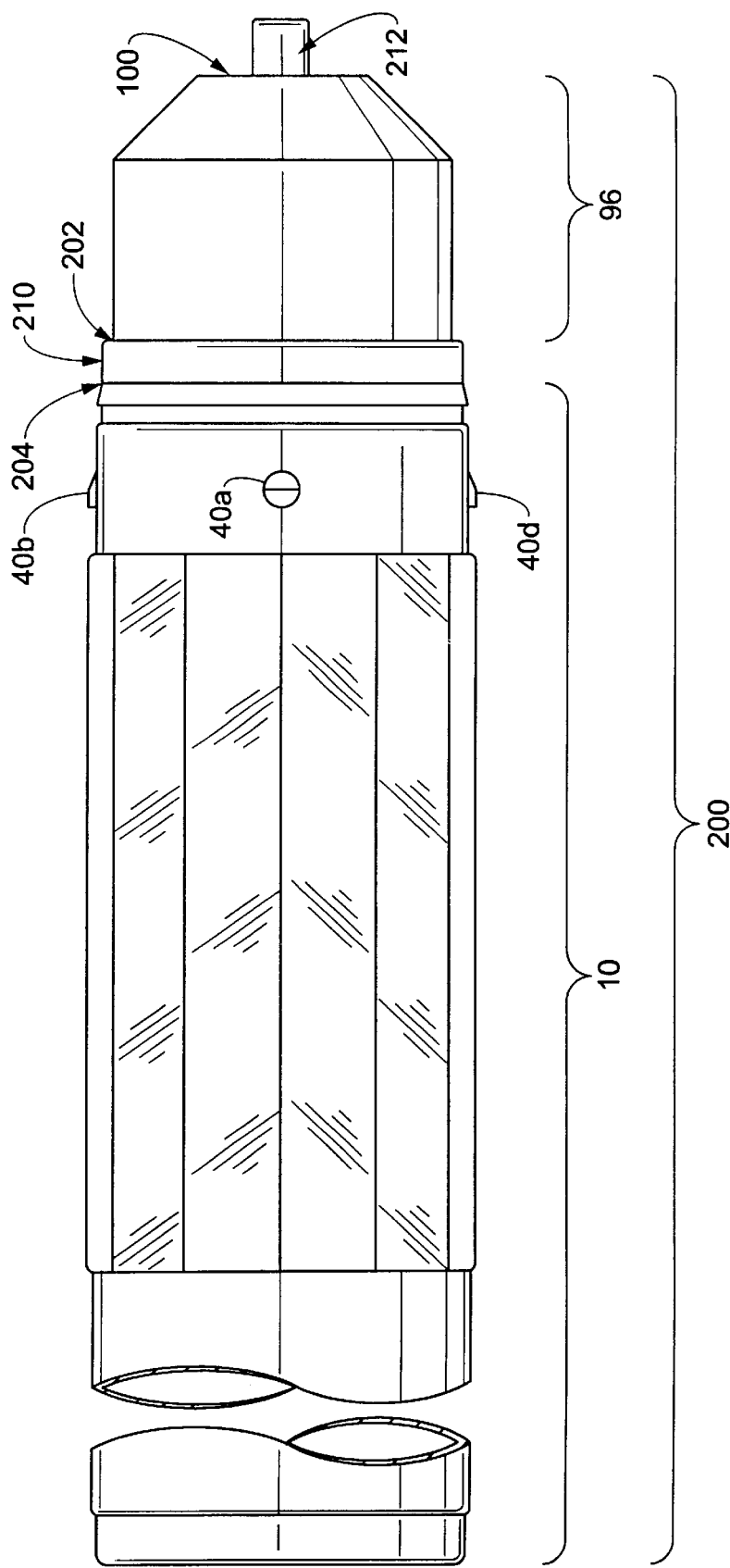
FIG. 3 illustrates a one-piece molded plastic body that comprises a cup storage tube section and a cup pushing member section.

Turning now to FIG. 3, it is preferred that the cup storage tube 10 and the cup pushing member 96 be defined as a hollow one-piece construction 200 from a molded plastic material such as food-grade polyvinyl chloride or any other suitable plastic material. A waste material zone 210 interconnects the cup pushing member portion 96 of the construction 200 and the cup storage tube portion 10. The cup pushing member portion 96 is connected to the waste zone 210 along a score line or grove 202, and the cup storage tube 10 is likewise connected to the opposite end of the waste zone 210 along a score line or groove 204. The grooves 202,204 facilitate a cutting or severing operation whereby each member 10,96 is separated from the waste zone 210. Of course, the grooves or score lines 202,204 can be defined as weakened or frangible zones that can be manually ruptured (without the aid of tools) in order to separate the members 10,96 from the waste zone 210, and the waste zone 210 can be omitted so that the members 10,96 are joined directly to each other. As a design feature or as a natural result of the molding operation, a nipple 212 or other projection can be formed as a part of the construction 200. The nipple 212 projects outwardly from the surface 100 of the pushing member 96. This nipple 212 can be removed and discarded or, if desired, left in place where it can act to center small cups such as soufflécups relative to the pushing member 96. Of course, this can also be accomplished by controlling the diameter and/or shape of the surface 100.

The invention has been described with reference to preferred embodiments. Obviously, modifications and alterations will occur to others upon reading and understanding the preceding specification. It is intended that the invention be construed as including all such modifications and alterations insofar as they are encompassed by one or more of the following claims as construed literally or according to the doctrine of equivalents or the like.

Having thus described the preferred embodiments, what is claimed is:

1. A cup dispenser comprising:
   a first molded plastic member defining a cup storage region for receiving a stacked plurality of associated cups and an open end in communication with the cup storage region;
   a molded plastic pushing member located in the cup storage region, said pushing member defining a pushing surface for engaging an open mouth of an innermost associated cup of the stacked plurality of associated cups;
   a diaphragm member connected to said first member and located adjacent said open end for restricting said open end, said diaphragm defining an opening through which a closed end of an outermost associated cup of the stacked plurality of associated cups projects, wherein upon exertion of manual force on said outermost associated cup in a direction away from said pushing member, said diaphragm deforms and allows selective passage of the associated outermost cup through said opening, wherein said diaphragm is defined by a one-piece elastomeric member and wherein a peripheral portion said diaphragm is frictionally engaged with a peripheral edge of the first member that defines said open end; and,
   a clamp member frictionally connected to said first member with said peripheral portion of said diaphragm frictionally secured between said clamp member and said peripheral edge of the first member.

2. The cup dispenser as set forth in claim 1, wherein said first member comprises a tubular member, said open end is circular and said clamp member is an annular member that circumscribes said open end.

3. A cup dispenser comprising:
   a first molded plastic member defining a cup storage region for receiving a stacked plurality of associated cups and an open end in communication with the cup storage region, wherein said first member comprises a plurality of spaced-apart lugs projecting outwardly therefrom adjacent said open end, and wherein said collar defines a plurality of regions located and dimensioned to receive and releasably retain said plurality of lugs, respectively, to effect fixed securement of said collar to said first member;
   a molded plastic pushing member located in the cup storage region, said pushing member defining a pushing surface for engaging an open mouth of an innermost associated cup of the stacked plurality of associated cups;
   a diaphragm member connected to said first member and located adjacent said open end for restricting said open end, said diaphragm defining an opening through which a closed end of an outermost associated cup of the stacked plurality of associated cups projects, wherein upon exertion of manual force on said outermost associated cup in a direction away from said pushing member, said diaphragm deforms and allows selective passage of the associated outermost cup through said opening; and,
   a collar releasably connected to said first member adjacent said open end, said collar comprising a flange adapted for fixed securement to an associated mounting structure.

4. A cup dispenser comprising:
   a first molded plastic member defining a cup storage region for receiving a stacked plurality of associated cups and an open end in communication with the cup storage region, wherein said first member defines at least one vent opening therethrough that communicates ambient air to said cup storage region;
   a molded plastic pushing member located in the cup storage region, said pushing member defining a pushing surface for engaging an open mouth of an innermost associated cup of the stacked plurality of associated cups;
   a diaphragm member connected to said first member and located adjacent said open end for restricting said open end, said diaphragm defining an opening through which a closed end of an outermost associated cup of the stacked plurality of associated cups projects, wherein upon exertion of manual force on said outermost associated cup in a direction away from said pushing member, said diaphragm deforms and allows selective passage of the associated outermost cup through said opening.

5. A cup dispenser comprising:
   a first molded plastic member defining a cup storage region for receiving a stacked plurality of associated cups and an open end in communication with the cup storage region;
   a molded plastic pushing member located in the cup storage region, said pushing member defining a pushing surface for engaging an open mouth of an innermost associated cup of the stacked plurality of associated cups, wherein said pushing surface is frusto-conical and said pushing member defines a transverse planar surface that projects into said opening defined in said diaphragm, and wherein said cup dispenser comprises an adhesive label including indicia secured to a transverse planar surface of said pushing member;
   a diaphragm member connected to said first member and located adjacent said open end for restricting said open end, said diaphragm defining an opening through which a closed end of an outermost associated cup of the stacked plurality of associated cups projects, wherein upon exertion of manual force on said outermost associated cup in a direction away from said pushing member, said diaphragm deforms and allows selective passage of the associated outermost cup through said opening.

* * * * *